United States Patent
Oehlerking et al.

[11] Patent Number: 6,155,634
[45] Date of Patent: Dec. 5, 2000

[54] BODY FRAME COMPONENT FOR A MOTOR VEHICLE AND METHOD OF PRODUCING IT

[75] Inventors: Conrad Oehlerking, Meine; Frank Welsch, Schwülper, both of Germany

[73] Assignee: Volkswagen AG, Wolfsburg, Germany

[21] Appl. No.: 09/088,286

[22] Filed: Jun. 2, 1998

[30] Foreign Application Priority Data

Jun. 2, 1997 [DE] Germany ............ 197 23 034

[51] Int. Cl.[7] ............................................... B60R 27/00
[52] U.S. Cl. ............................ 296/210; 296/203.01
[58] Field of Search ............... 296/37.7, 203.01, 296/210

[56] References Cited

U.S. PATENT DOCUMENTS

| | | | |
|---|---|---|---|
| 2,138,084 | 11/1938 | Weymann | 296/210 X |
| 2,155,503 | 4/1939 | Miller | 296/210 |
| 2,157,649 | 5/1939 | Ekergian | 296/203.01 |
| 2,164,097 | 6/1939 | Tjaarda | 296/203.01 X |
| 2,164,098 | 6/1939 | Tjaarda | 296/203.01 |
| 2,669,462 | 2/1954 | Toncray et al. | 296/203.01 X |
| 3,833,254 | 9/1974 | Renner | 296/210 |
| 4,834,448 | 5/1989 | Sakamoto et al. | 296/37.7 X |
| 4,867,362 | 9/1989 | Finnegan et al. | 296/37.7 X |
| 4,900,083 | 2/1990 | Kumasaka et al. | 296/210 X |
| 4,950,026 | 8/1990 | Emmons | 296/203.01 |
| 5,595,256 | 1/1997 | Mueller . | |
| 5,611,568 | 3/1997 | Masuda . | |
| 5,921,618 | 7/1999 | Mori et al. | 296/203.01 X |
| 5,934,739 | 8/1999 | Waldeck | 296/210 X |

FOREIGN PATENT DOCUMENTS

| | | |
|---|---|---|
| 0574777 | 3/1933 | Germany . |
| 0692243 | 5/1940 | Germany . |
| 2558332 | 12/1975 | Germany . |
| 0633182 | 1/1995 | Germany . |
| 4440192 | 5/1995 | Germany . |

*Primary Examiner*—Joseph D. Pape
*Attorney, Agent, or Firm*—Baker Botts L.L.P.

[57] ABSTRACT

A body frame component is designed so that it absorbs at least one force acting on it. The specific shape of the body frame component results in differing load or stress conditions within different regions of the body frame component when the force is being absorbed. In particular, high load or stress conditions occur in a first region and low load or stress conditions occur in a second region of the component. A reduction in the weight of the body frame component is achieved by forming at least one through hole in a region of the low load or stress conditions for the purpose of reducing the amount of material in the body frame component. In producing the body frame component, the through hole is formed either before or during the shaping of flat material to produce the specific shape of the body frame component.

15 Claims, 2 Drawing Sheets

BODY FRAME COMPONENT FOR A MOTOR VEHICLE AND METHOD OF PRODUCING IT

BACKGROUND OF INVENTION

This invention relates to body frame components for motor vehicles which have a specific shape and are designed to absorb a force acting on the component which, because of the specific shape of the body frame component, produces differing load or stress conditions within different regions of the component when the force is being applied, in particular, high load or stress conditions in a first region and low load or stress conditions in a second region.

The invention furthermore relates to a method of producing a motor vehicle, which is formed by reshaping an essentially flat material to produce a specific shape which can be fitted within a vehicle body and which, when fitted in the body, absorbs at least one force acting on the body frame component, and in which the specific shape of the body frame component results in differing load or stress conditions being produced within different regions of the body frame component when the force is being applied.

The prior art discloses body frame components which can be produced in a variety of ways so that the overall weight of a motor vehicle containing the components is as low as possible. In order for such body frame components to absorb forces acting on them, the components have a specific shape and a material thickness corresponding to their purpose. The material thickness differs in different regions of the component depending on the loads or stresses which may occur in those regions. Thus, in regions having high load or stress conditions, a far greater thickness of material is provided than in regions having low load or stress conditions.

Weight-saving body framework components have, until now, been produced with the aid of the "tailored-blank" technique. In this technique, various metal elements, generally metal sheets of differing structure which also have differing sheet thicknesses, are welded to one another in such a manner that a body frame component having a specific shape is produced. This body frame component has differing wall thicknesses or material thicknesses in different regions because of the use of metal sheets of differing sheet thickness. Furthermore, body frame components of this type having differing wall thicknesses provided in different regions may also be produced by die-casting, which is expensive.

German Offenlegungsschrift No. 25 58 332 and European Patent No. 0 633 182 disclose separate structural elements which are perforated sheets or steel lattices and are fastened to the inside of hoods or doors of a vehicle in order to increase mechanical strength or rigidity. Such structural elements are bonded onto the corresponding regions of a vehicle door or are connected to the vehicle-door panel by cold deformation.

The conventional body frame components which are produced with the aid of the "tailored-blank" methods or by die-casting are not of optimum design, on the one hand, and, on the other hand, the methods of producing them are very expensive. Experience has shown that the complex body frame components to be produced with the aid of the "tailored-blank" method can only be manufactured at high cost since various metal sheets of differing structure must be used and the appropriate manufacturing tolerances for the body frame component are difficult to maintain during assembly. Furthermore, the welds in the components not only have to be designed precisely but they also have to absorb the corresponding forces, and welds within the body frame component constitute weak points. As a result, the entire method for this type of production is extremely time-consuming.

SUMMARY OF THE INVENTION

Accordingly, it is an object of the present invention to provide a body frame component for a motor vehicle and a method for producing it which overcome disadvantages of the prior act.

Another object of the invention is to provide a body frame component having as little weight as possible and which has no significant manufacturing tolerances and as few weak points as possible, and a method of producing it which is not excessively time-consuming.

These and other objects of the invention are attained by providing a component having at least one through hole formed in a region of the low load or stress conditions for the purpose of reducing the amount of material in the body frame component. In accordance with the method of the invention for producing a body frame component, at least one through hole is formed in the region of a flat material in which there is a low load or stress condition after the component has been shaped, when the body frame component is mounted in the vehicle, for the purpose of reducing the amount of material in the body frame component. The through hole or holes are formed before the flat material is shaped or while it is being shaped to provide the specific shape of the body frame component.

Because at least one through hole is formed in a region of low load or stress conditions for the purpose of reducing the amount of material in the body frame component, i.e. for the purpose of saving weight, the disadvantages of the prior art described above are avoided. For one thing, the amount of material used for the body frame component can now be reduced in a simple manner in suitable regions, with the result that assembly of the body frame component, which up to now, using the "tailored-blank" method, has been relatively complex because it requires sheet-metal parts of various thickness, is unnecessary. The fact that complex assembly is no longer necessary means not only that better tolerance values can be achieved, but also that welds which were hitherto necessary and which form weak points are also unnecessary. Since it is now possible for a plurality of through holes to be produced before shaping or during shaping, the method of producing a body frame component can also be carried out in a relatively short time.

This results in a whole range of options for advantageously developing and refining the body frame component according to the invention and the method of producing it.

Further objects and advantages of the invention will be apparent from a reading of the following description in conjunction with the accompanying drawings in which:

FIG. 1 is a schematic plan view showing a representative embodiment of body frame component having a specific shape in accordance with the invention; and FIG. 2 is a view showing a flat piece of material before it is shaped to produce a body frame component in accordance with the invention.

DESCRIPTION OF PREFERRED EMBODIMENTS

Figure 1:
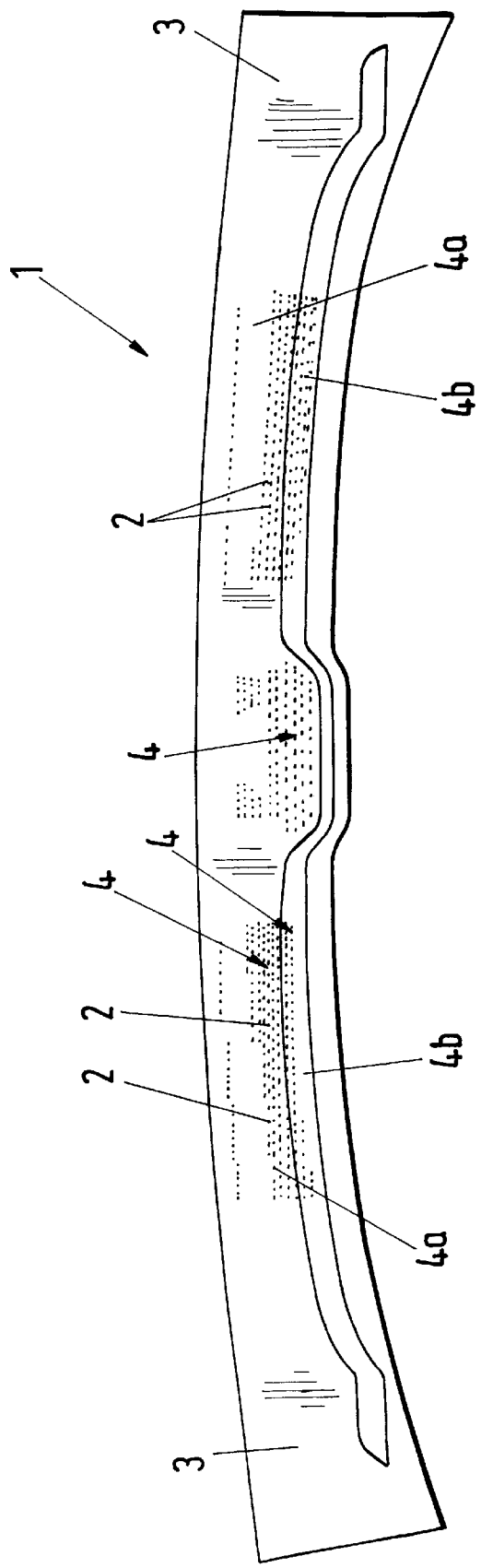

In the typical embodiment of the invention shown in FIG. 1, a body frame component 1 constitutes a member designed in the form of a roof-rack support for a motor vehicle body.

The body frame component 1 has a specific shape which is typical for a roof-rack support and is designed so that it absorbs the forces acting on a roof-rack support, that is, when mounted in place, it forms a load-bearing part of the vehicle body. The specific shape of the completed body frame component 1 causes differing load or stress conditions within different regions such as end regions 3, central flat and raised regions 4, intermediate flat regions 4a, and intermediate depressed regions 4b of the body frame component 1 when these forces are being absorbed, i.e. whenever the body frame component 1, which is designed as a roof-rack support, is fitted and used in the roof region of a motor vehicle. As a result there are high load or stress conditions in the first regions 3 of the component, that is in the edge regions, and low load or stress conditions in second regions 4, 4a and 4b, that is, in the central and intermediate regions of the roof-rack support. The load or stress conditions which occur can differ widely in the different regions. This is dependent, on the one hand, on the specific shape of the body frame component 1 and, on the other hand, on the forces or force components occurring in the different regions, for example, transverse forces, normal forces or else bending forces or moments.

A saving on weight of the body frame component 1 results from the presence of a least one through hole 2 or in the case of the body frame component 1 shown in FIG. 1, a plurality of through holes 2, formed in the regions 4, 4a, and 4b subjected to low load or stress, for the purpose of reducing of this amount of material in the body frame component 1.

A defined pattern of holes is formed by the through holes 2 with the result that the weight of the body frame component 1 is optimized in accordance with the loads acting on the body frame component 1.

The selection of specific hole spacings between the through holes 2 in the patterns permits the formation of a gradual transition from a region of a relatively high loads or stresses to a region of lower loads or stresses.

It is of great advantage that the formation of the through holes 2 for the purpose of reducing the amount of material makes it possible for the body frame component 1 to have overall an essentially uniform material thickness. As a result, the body frame component 1 can be produced in a simple manner from a flat material, in particular from a metal blank, by one or more shaping processes.

In order for the body frame component 1 to be configured in an optimum manner with respect to its weight in accordance with the loads existing in the body frame component 1, certain parameters may be varied. The through holes 2 may thus have a defined shape, for example they may be of circular, triangular or quadrilateral shape. Furthermore, the through holes 2 may have different, selected, hole diameters depending on the loads which occur. As a result, the shape and the hole diameter of the through holes 2 can be matched to the loads which occur in the body frame component 1. Moreover, the spacing of the through holes 2 from each other and use of a defined pattern of holes makes it possible for the body frame component 1 to be optimized in accordance with the loads which occur. For example, the through holes 2 may be arranged in defined rows as shown in FIG. 1.

The through holes 2 are, in principle, provided at a selected spacing with respect to a point at which force is introduced into the body frame component 1, in particular at a selected spacing with respect to hinges, spring legs, functional surfaces or gussets, since these regions of the body frame component 1, like the regions 3 of FIG. 1, which are directly adjacent to a point at which force is introduced, are subject to greater stress. Bearing surfaces for connections to other components, and also reference surfaces, for example, for positioning the component during manufacture, can, in particular, constitute functional surfaces.

In the case of the body frame component 1 shown in FIG. 1, which is designed as a roof-rack support, more through holes 2 are thus formed in the central and intermediate regions 4. 4a, and 4b of the roof-rack support and fewer are formed in the left and right outer end regions 3 near the fastening points. It can also be seen in FIG. 1 that the through holes 2, which are represented as points, form a stepped pattern of increasing hole density in the direction from one edge toward the lateral center of the body frame component 1, the through holes 2 being arranged in defined rows.

The typical body frame component 1 shown in FIG. 1 is produced from metal, preferable from a flat metal blank of uniform sheet thickness. This will be explained in more detail below with respect to the method of producing the body frame component 1, which, when completed, has a three-dimensional structure with a higher regions 4a and a lower regions 4b, as can be seen schematically in FIG. 1.

Figure 2:
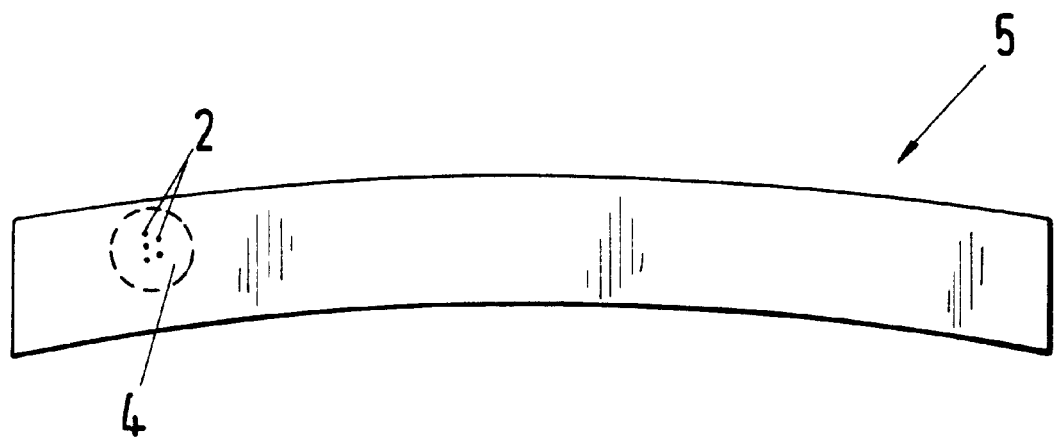

FIG. 2 illustrates a metal blank 5 which can be shaped by a shaping process so that the body frame component 1 shown in FIG. 1 is produced with the specific shape necessary for the roof-rack support. In this illustration, just a few through holes 2 are indicated in the left part of the metal blank 5. The through holes 2, which are shown as circular, preferably have a hole diameter of about 3 mm and a minimum hole spacing of about 3 mm.

Internal components which are subjected to locally different loads, such as profile half shells, or reinforcing sheets, such as web sheets for sills and reinforcements for seat belts or inner transverse members etc., are, in principle, suitable for the use of this technique.

In principle, in the method of producing a body frame component 1 for a motor-vehicle body the body frame component 1 is formed from an essentially flat material. The flat material, usually a metal blank 5, is formed to produce a specific shape which can be fitted within a vehicle body. When fitted in the body, the body frame component 1 absorbs the forces acting on it and the specific shape of the body frame component 1 results in the production of differing load or stress conditions within different regions of the body frame component by the absorption of these forces.

The saving on weight for the body frame component 1 combined with the saving in the cost of making such a component using the method of the invention result because, before the flat material is shaped or while it is being shaped to give the specific shape of the body frame component 1, the through holes 2 are formed in the regions which are subject to low load or stress conditions when body frame component is mounted in the vehicle frame, such as the region 4 of the flat material, for the purpose of reducing the amount of material in the body frame component 1. The through holes 2 can be made before the shaping process, for example, while a material blank 5 is being cut in a press working line, with the result that, apart from making the holes with a punching tool, no additional further step is required for forming the through holes 2. On the other hand, the through holes 2 may equally well be made during the shaping process. The method is preferably carried out with the aid of a computer.

In the above-described embodiment, the shaping process is carried out by deep-drawing. Consequently, the through holes 2 can be formed before the deep-drawing while the flat material, in this case the metal blank 5 shown in FIG. 2, is being cut. However, it is also possible for the through holes to be formed in the flat material during the deep-drawing step. For this purpose, the tools necessary for the deep-drawing could have any appropriate design.

It is of advantage that the body frame component 1 produced from a metal blank 5 has an essentially constant thickness since this substantially simplifies further treatment and processing because there is no need to take into account abrupt changes in thickness. A further advantage of using perforated components is in the painting of profile-forming parts. In this case, the holes make it possible for cavities to be reached by the paint applied in various procedures more readily and thereby allows the protection against corrosion to be improved.

Although the invention has been described herein with reference to specific embodiments, many modifications and variations therein will readily occur to those skilled in the art. Accordingly, all such variations and modifications are included within the intended scope of the invention.

We claim:

1. A body frame component for a motor vehicle comprising a component which absorbs at least one force acting on the component with differing load or stress conditions produced within different regions of the component when the force is being absorbed, with high load or stress conditions in a first region of the component and low load or stress conditions in a second region of the component, wherein a first through hole arrangement having at least one through hole is formed in a region of low load or stress conditions of the component and a second through hole arrangement having at least one through hole formed in a second region of high load or stress conditions of the component, for the purpose of reducing the amount of material in the component and the first and second through hole arrangements are configured to provide different resistances to applied loads in accordance with stress conditions which occur in the corresponding regions.

2. A body frame component according to claim 1 wherein a plurality of through holes are formed in the region of low load or stress conditions.

3. A body frame component according to claim 2 wherein the plurality of through holes are formed in a defined pattern.

4. A body frame component according to claim 3 wherein the defined pattern of holes reduces the weight of the body frame component to an optimum extent with respect to the loads acting within the low load region of the body frame component.

5. A body frame component according to claim 2 wherein the spacings between adjacent through holes are varied to provide a gradual transition from a region of a relatively high load or stress conditions to a region of a lower load or stress conditions.

6. A body frame component according to claim 1 wherein the body frame component has a substantially uniform material thickness throughout.

7. A body frame component according to claim 2 wherein the at least one through hole has a defined selected shape.

8. A body frame component according to claim 1 wherein the at least one through hole has a shape selected from the group consisting of circular, triangular and quadrilateral shapes.

9. A body frame component according to claim 1 wherein the at least one through hole in the first region has a selected hole diameter different from that of the at least one through hole in the second region.

10. A body frame component according to claim 1 wherein the at least one through hole in each of the first and second regions has a shape and diameter which is matched to the load or stress conditions which occur in the corresponding region of the body frame component.

11. A body frame component according to claim 1 wherein the at least one through hole in each region is provided at a selected spacing from a point at which a force is introduced into the corresponding region of the body frame component.

12. A body frame component according to claim 1 wherein the body frame component constitutes a roof-rack support for a motor vehicle.

13. A body frame component according to claim 12 wherein a plurality of through holes are formed in a central region of the roof-rack support.

14. A body frame component according to claim 3 wherein the defined pattern of holes provides a transition between low stress and high stress regions of the component.

15. A body frame component according to claim 1 wherein the material of the body frame component is metal.

* * * * *